United States Patent
Tomatsuri et al.

(10) Patent No.: US 8,620,499 B2
(45) Date of Patent: Dec. 31, 2013

(54) HYBRID VEHICLE AND CONTROL METHOD THEREOF

(75) Inventors: Mamoru Tomatsuri, Toyota (JP); Takeshi Harada, Nagoya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 990 days.

(21) Appl. No.: 12/474,601

(22) Filed: May 29, 2009

(65) Prior Publication Data
US 2009/0299560 A1    Dec. 3, 2009

(30) Foreign Application Priority Data

May 29, 2008   (JP) .................................. 2008-141341

(51) Int. Cl.
- G06F 19/00    (2011.01)
- B60W 10/06    (2006.01)
- B60W 10/08    (2006.01)
- F02M 25/07    (2006.01)

(52) U.S. Cl.
USPC ........ 701/22; 701/108; 701/110; 123/568.21; 123/568.26; 180/65.28; 60/605.2; 903/905

(58) Field of Classification Search
USPC ............... 701/1, 22, 29, 36, 70, 99, 107, 108, 701/101–105, 110, 29.1; 123/568.12, 123/568.16, 568.19, 568.21, 568.11, 123/568.02, 568.29, 568.2; 180/65.21, 180/65.27, 65.28, 65.285, 309, 65.275; 60/602, 603, 605.1, 605.2; 903/902, 903/903–905

See application file for complete search history.

(56) References Cited

U.S. PATENT DOCUMENTS 5,623,906 A * 4/1997 Storhok .................... 123/406.23
7,295,915 B1 * 11/2007 Okubo et al. ................. 701/110

FOREIGN PATENT DOCUMENTS

| JP | 81 14156 | 5/1996 |
|---|---|---|
| JP | 8114156 | 5/1996 |
| JP | 2004100464 | 4/2004 |
| JP | 2004353580 | 12/2004 |
| JP | 2005180331 A | 7/2005 |
| JP | 2007118780 A | 5/2007 |
| JP | 2007132224 A | 5/2007 |

\* cited by examiner

*Primary Examiner* — Thomas Tarcza
*Assistant Examiner* — Edward Pipala
(74) *Attorney, Agent, or Firm* — Gifford, Krass, Sprinkle, Anderson & Citkowski, P.C.

(57) ABSTRACT

After completion of warm-up of an engine, upon satisfaction of an exhaust gas recirculation condition by setting the drive mode of a hybrid vehicle to a normal mode according to the driver's accelerator operation, when a power difference ΔPe representing a decrease rate of a power demand Pe* required for the engine is less than a preset reference value α, the engine and motors MG1 and MG2 are controlled to ensure output of a power equivalent to the power demand Pe* from the engine with prohibition for exhaust gas recirculation via an EGR valve and to ensure output of a torque equivalent to a torque demand Tr* to a ring gear shaft or an axle (steps S300 to S330 and step S390).

6 Claims, 8 Drawing Sheets

HYBRID VEHICLE AND CONTROL METHOD THEREOF

CROSS-REFERENCE TO RELATED APPLICATIONS

This application claims priority of Japanese Patent Application No. 2008-141341 filed on May 29, 2008, which is incorporated herein by reference.

FIELD OF THE INVENTION

The present invention relates to a hybrid vehicle, as well as to a control method of the hybrid vehicle.

DESCRIPTION OF THE PRIOR ART

One proposed arrangement of an internal combustion engine disclosed in Japanese Patent Laid-Open No. 2004-353580 applies control of increasing the amount of fuel supply in a drive range with high exhaust gas temperature in combination with exhaust gas recirculation (EGR) control of recirculating part of an exhaust gas from an exhaust system to an air intake system, so as to restrict a temperature increase of the exhaust gas. This proposed internal combustion engine detects a change rate of a throttle opening (opening of a throttle valve) under restriction of the temperature increase of the exhaust gas and identifies that the internal combustion engine is in an abrupt deceleration state based on the detected change rate of the throttle opening. Upon identification of the abrupt deceleration state, the internal combustion engine stops the exhaust gas recirculation control, in order to prevent the occurrence of an engine misfire caused by a delay in decrease of the amount of exhaust gas recirculation in the abrupt deceleration state. Another proposed arrangement of the internal combustion engine disclosed in Japanese Patent Laid-Open No. H08-114156 identifies whether the internal combustion engine is in the abrupt deceleration state based on the observed throttle opening and, upon identification of the abrupt deceleration state, computes a current target valve opening of an exhaust gas recirculation valve (EGR valve) by multiplying a previous target valve opening by the change rate of the throttle opening. Such computation makes the target valve opening of the exhaust gas recirculation valve respond to a change of the throttle opening. This procedure aims to eliminate a time delay of an actual opening of the exhaust gas recirculation valve and thereby prevent the occurrence of an engine misfire caused by a significant change of an actual EGR rate. Still another proposed arrangement of the internal combustion engine disclosed in Japanese Patent Laid-Open No. 2004-100464 specifies an EGR map value from a rotation speed and an inspiratory pressure of the internal combustion engine, sets the smaller between the specified EGR map value and an EGR upper limit value in the deceleration state of the vehicle to a target EGR opening, and quickly controls the exhaust gas recirculation valve to its closed position based on the set target EGR opening.

Any of these prior art internal combustion engines is basically applied to a conventional vehicle equipped with an internal combustion engine as an only source of driving power. In such a conventional vehicle, there is a substantially constant correlation of the driver's accelerator operation amount to the throttle opening. In the vehicle equipped with the prior art internal combustion engine, the degree of the driver's deceleration demand is definable by the change rate of the throttle opening. Controlling the exhaust gas recirculation valve according to the change rate of the throttle opening aims to prevent the occurrence of a misfire of the internal combustion engine caused by the exhaust gas that is recirculated from the exhaust system specially in the abrupt deceleration state and remains in the air intake system. In a hybrid vehicle equipped with both an internal combustion engine and a motor as sources of driving power, a drive point of the internal combustion engine (specified by a combination of a target rotation speed and a target torque) is set according to the drive mode and the operating condition of the hybrid vehicle, regardless of the driver's accelerator operation. Despite that the driver does not give any deceleration demand, such setting of the drive point may cause the throttle valve to have a behavior similar to the behavior in a deceleration state of the vehicle. In the hybrid vehicle equipped with an internal combustion engine including an exhaust gas recirculation structure, identification of permission or prohibition for exhaust gas recirculation based on the throttle opening may lead to inadequate permission for the exhaust gas recirculation in a state that should actually prohibit the exhaust gas recirculation or may lead to inadequate prohibition for the exhaust gas recirculation in a state that has no trouble caused by the exhaust gas recirculation and should actually give permission for the exhaust gas recirculation.

SUMMARY OF THE INVENTION

In a hybrid vehicle equipped with an internal combustion engine including an exhaust gas recirculation structure, there would thus be a demand for adequately performing exhaust gas recirculation and effectively preventing the occurrence of a misfire of the internal combustion engine caused by the exhaust gas recirculation.

The present invention accomplishes at least part of the demand mentioned above and the other relevant demands by the following configurations applied to the hybrid vehicle and to the control method of the hybrid vehicle.

One aspect of the invention is directed to a hybrid vehicle having: an internal combustion engine designed to output driving power and equipped with an exhaust gas recirculation structure arranged to recirculate an exhaust gas from an exhaust system to an air intake system, a motor designed to output driving power, and an accumulator designed to transmit electric power to and from the motor. The hybrid vehicle further includes: a driving force demand setting module configured to set a driving force demand required for driving the hybrid vehicle, in response to a driver's accelerator operation; an engine power demand setting module configured to set an engine power demand required for the internal combustion engine, based on the set driving force demand; a power decrease rate acquisition module configured to acquire a decrease rate of the engine power demand; and a controller configured to control the internal combustion engine and the motor so that the internal combustion engine outputs a power equivalent to the set engine power demand with exhaust gas recirculation from the exhaust system to the air intake system by means of the exhaust gas recirculation structure and a driving power equivalent to the set driving force demand is ensured when a preset exhaust gas recirculation condition is satisfied and the acquired decrease rate of the engine power demand is not higher than a predetermined rate, the controller controlling the internal combustion engine and the motor so that the internal combustion engine outputs a power equivalent to the set engine power demand without the exhaust gas recirculation and the driving power equivalent to the set driving force demand is ensured when the preset exhaust gas recirculation condition is satisfied and the acquired decrease rate of the engine power demand is higher than the predetermined rate.

The hybrid vehicle according to this aspect of the invention sets the driving force demand required for driving the hybrid vehicle, in response to the driver's accelerator operation, while setting the engine power demand required for the internal combustion engine, based on the set driving force demand. When the decrease rate of the engine power demand is not higher than the predetermined rate upon satisfaction of the preset exhaust gas recirculation condition, the internal combustion engine and the motor are controlled to ensure output of the power equivalent to the set engine power demand from the internal combustion engine accompanied with the exhaust gas recirculation from the exhaust system to the air intake system by means of the exhaust gas recirculation structure and to generate the driving power equivalent to the set driving force demand. When the decrease rate of the engine power demand is higher than the predetermined rate upon satisfaction of the preset exhaust gas recirculation condition, on the other hand, the internal combustion engine and the motor are controlled to ensure output of the power equivalent to the set engine power demand from the internal combustion engine with prohibition for the exhaust gas recirculation and to generate the driving power equivalent to the set driving force demand. The decrease rate of the engine power demand, which is based on the driving force demand set according to the driver's accelerator opening, adequately indicates the degree of the driver's deceleration demand by the driver's accelerator operation. The internal combustion engine is controlled based on the set engine power demand, so as to output the power equivalent to the set engine power demand. The permission or the prohibition for the exhaust gas recirculation is identified, based on the result of comparison between the decrease rate of the engine power demand reflecting an operating condition of the internal combustion engine and the predetermined rate. This arrangement ensures adequate setting of the predetermined rate given as a reference value. Adequate setting of the reference value in this manner desirably prevents restriction of the exhaust gas recirculation beyond necessity, while effectively stopping the exhaust gas recirculation when there is a potential for the occurrence of an engine misfire caused by the exhaust gas remaining in the air intake system, for example, on the occasion of the driver's deceleration demand. The engine power demand is not an observed value but a command value, unlike the opening of the throttle valve. The simple comparison between the decrease rate of the engine power demand and the predetermined rate given as the reference value ensures the highly responsive identification of the permission or the prohibition for the exhaust gas recirculation to the driver's accelerator operation. The hybrid vehicle according to this aspect of the invention thus adequately performs the exhaust gas recirculation and thereby effectively prevents the occurrence of a misfire of the internal combustion engine caused by the exhaust gas recirculation.

In one preferable embodiment of the invention, the hybrid vehicle of the above aspect further has: a target engine rotation speed setting module configured to set a target rotation speed of the internal combustion engine, based on the set engine power demand and a predetermined drive point setting restriction; a target throttle opening setting module configured to set a target opening of a throttle valve included in the internal combustion engine, based on the set engine power demand and the set target rotation speed of the internal combustion engine; and a throttle controller configured to control the throttle valve to make an opening of the throttle valve sufficiently close to the set target opening. The predetermined rate given as the reference value is thus adequately specifiable by taking into consideration the opening of the throttle valve corresponding to the engine power demand and the target rotation speed of the internal combustion engine.

In another preferable embodiment of the invention, the hybrid vehicle of the above aspect further has: a target recirculation amount setting module configured to, when a preset exhaust gas recirculation condition is satisfied and the acquired decrease rate of the engine power demand is not higher than a predetermined rate, set a target recirculation amount of the exhaust gas, which is to be recirculated from the exhaust system to the air intake system by means of the exhaust gas recirculation structure, based on a load and a rotation speed of the internal combustion engine.

In still another preferable embodiment of the invention, the hybrid vehicle of the above aspect further has: an electric power-dynamic power input output structure connected with an engine shaft of the internal combustion engine and with a preset axle and configured to input and output power from and to the engine shaft and the preset axle accompanied with input and output of electric power and dynamic power and to transmit electric power to and from the accumulator. In the hybrid vehicle of this embodiment, the motor is arranged to input and output power from and to either the preset axle or another axle different from the preset axle. In one preferable application of the hybrid vehicle of this embodiment, the electric power-dynamic power input output structure includes: a motor for power generation designed to input and output power; and a three shaft-type power input output assembly connected with three shafts, the preset axle, the engine shaft of the internal combustion engine, and a rotating shaft of the motor for power generation, the three shaft-type power input output assembly configured to input and output power from and to one remaining shaft, based on input and output of powers from and to any two shafts selected among the three shafts.

Another aspect of the invention is directed to a control method of a hybrid vehicle. The hybrid vehicle includes: an internal combustion engine designed to output driving power and equipped with an exhaust gas recirculation structure arranged to recirculate an exhaust gas from an exhaust system to an air intake system, a motor designed to output driving power, and an accumulator designed to transmit electric power to and from the motor. The control method sets a driving force demand required for driving the hybrid vehicle, in response to a driver's accelerator operation, while setting an engine power demand required for the internal combustion engine, based on the set driving force demand. When a decrease rate of the engine power demand is not higher than a predetermined rate upon satisfaction of a preset exhaust gas recirculation condition, the control method controls the internal combustion engine and the motor such as to ensure output of a power equivalent to the set engine power demand from the internal combustion engine accompanied with exhaust gas recirculation from the exhaust system to the air intake system by means of the exhaust gas recirculation structure and generate a driving power equivalent to the set driving force demand. When the decrease rate of the engine power demand is higher than the predetermined rate upon satisfaction of the preset exhaust gas recirculation condition, on the other hand, the control method controls the internal combustion engine and the motor such as to ensure output of the power equivalent to the set engine power demand from the internal combustion engine with prohibition for the exhaust gas recirculation and generate the driving power equivalent to the set driving force demand.

The control method of the hybrid vehicle according to the above aspect of the invention thus adequately performs the exhaust gas recirculation and thereby effectively prevents the occurrence of a misfire of the internal combustion engine caused by the exhaust gas recirculation.

DETAILED DESCRIPTION OF THE PREFERRED EMBODIMENTS

One mode of carrying out the invention is described below as a preferred embodiment.

Figure 1:
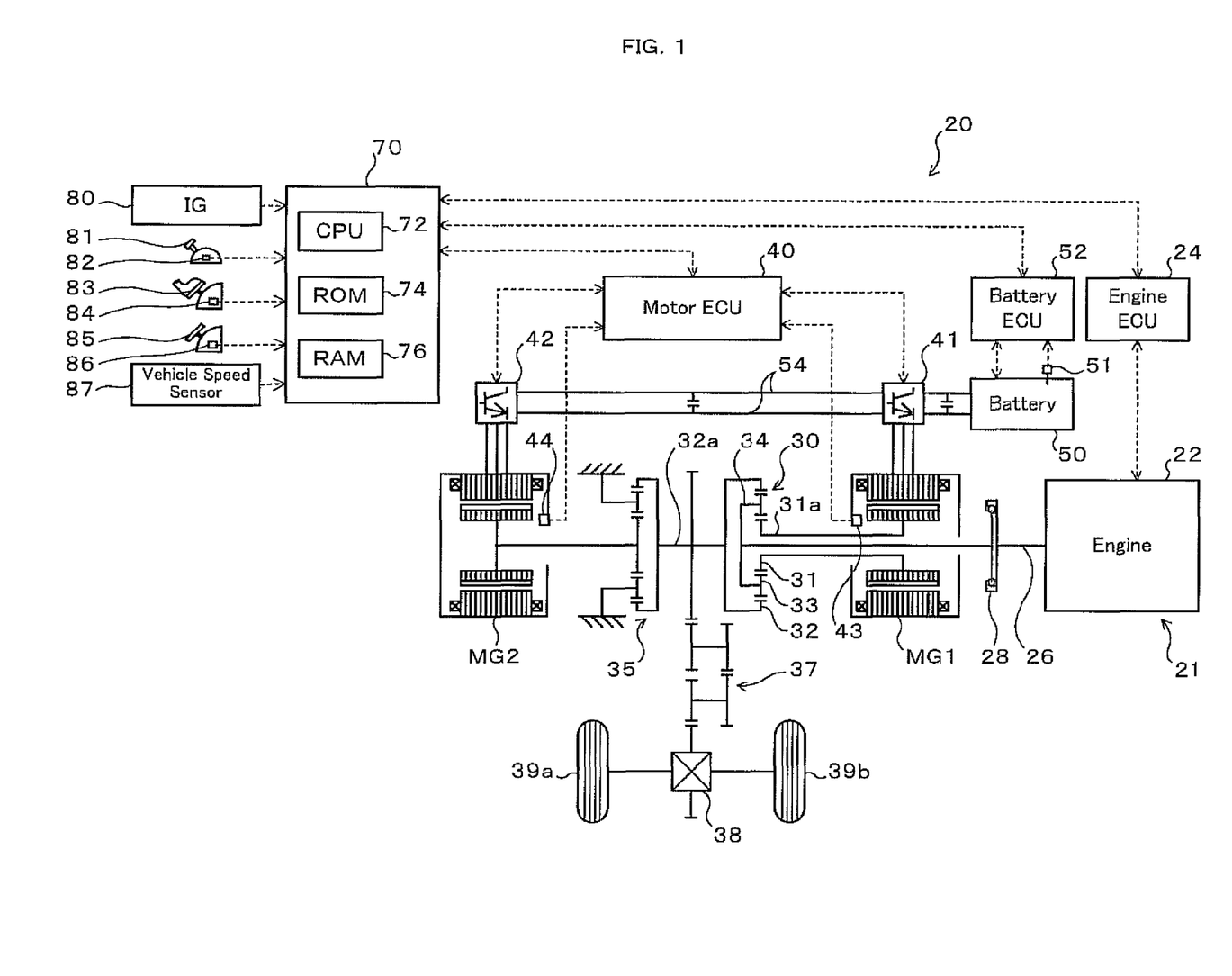
FIG. 1 schematically illustrates the configuration of a hybrid vehicle in one embodiment of the invention.

FIG. 1 schematically illustrates the configuration of a hybrid vehicle 20 as one embodiment according to the invention. The hybrid vehicle 20 of the illustrated configuration includes an internal combustion engine system 21 including an engine 22, a three shaft-type power distribution integration mechanism 30 connected via a damper 28 to a crankshaft 26 (an engine shaft) of the engine 22, a motor MG1 connected to the power distribution integration mechanism 30 and designed to have power generation capability, a reduction gear 35 attached to a ring gear shaft 32a or an axle linked with the power distribution integration mechanism 30, a motor MG2 connected to the ring gear shaft 32a via the reduction gear 35, and a hybrid electronic control unit 70 (hereafter referred to as hybrid ECU) configured to control the operations of the whole hybrid vehicle 20.

Figure 2:
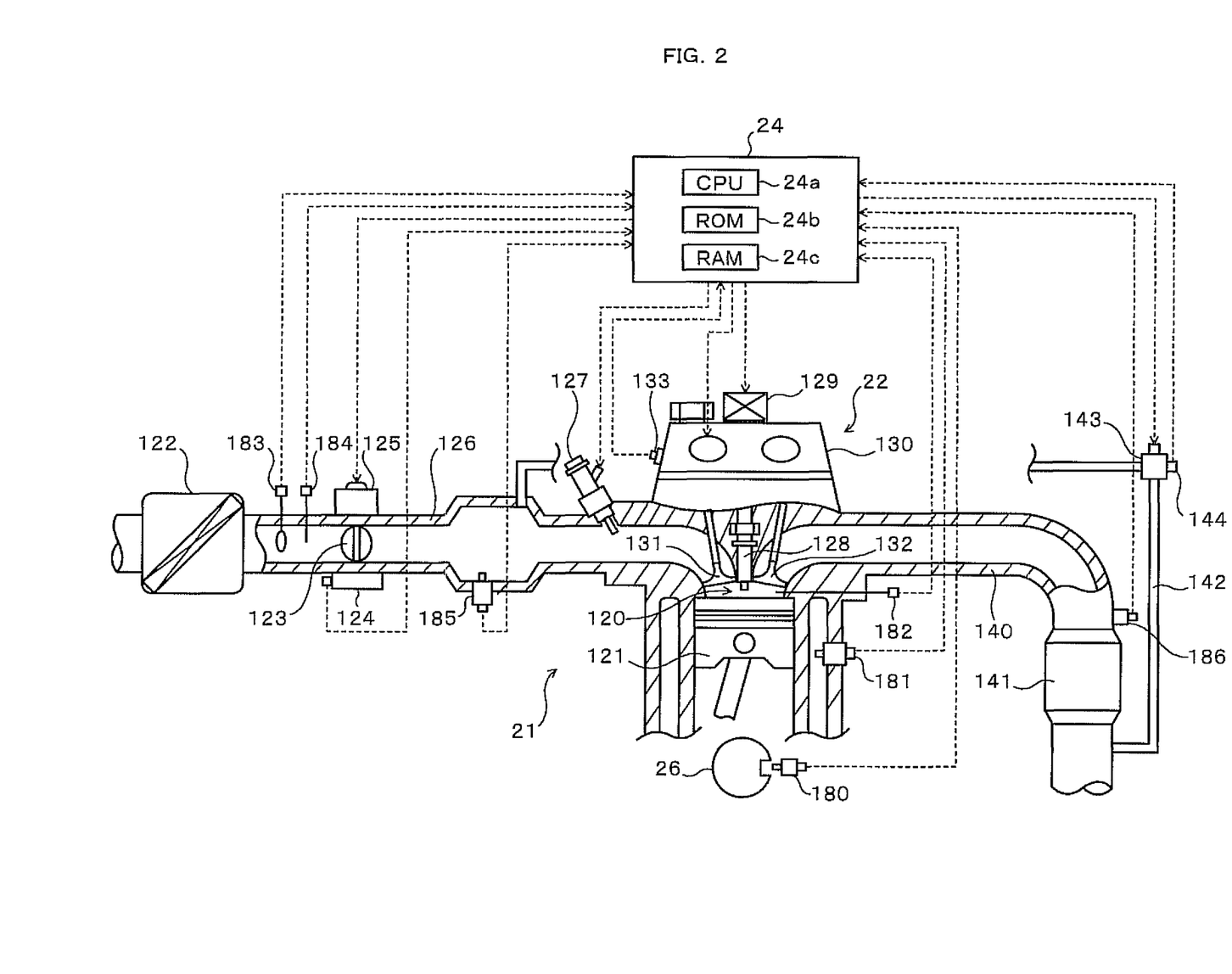
FIG. 2 shows the schematic structure of an internal combustion engine system mounted on the hybrid vehicle of the embodiment.

The engine 22 included in the internal combustion engine system 21 is constructed as an internal combustion engine that makes an air fuel mixture of a hydrocarbon fuel, such as gasoline or light oil, and the air explosively combusted in a combustion chamber 120 and converts the reciprocating motions of a piston 121 induced by the explosive combustion of the air fuel mixture into rotational motions of a crankshaft 26, so as to output power. As illustrated in FIG. 2, in the structure of the engine 22, the air cleaned by an air cleaner 122 is taken into an air intake pipe 126 by means of a throttle valve 123, while the fuel, such as gasoline, is injected from a fuel injection valve 127 to be mixed with the intake air. The resulting air fuel mixture is introduced into the combustion chamber 120 via an air intake valve 131 operated by a valve operating mechanism 130 constructed as a variable valve timing mechanism and is ignited with electric spark made by a spark plug 128 to be explosively combusted. The exhaust gas from the engine 22 goes through an exhaust valve 132 and an exhaust manifold 140 and is introduced into a catalytic converter 141. The catalytic converter 141 is filled with an exhaust gas purification catalyst (three-way catalyst) that purifies the exhaust gas by conversion of toxic components included in the exhaust gas, that is, carbon monoxide (CO), hydrocarbons (HC), and nitrogen oxides (NOx), into harmless components. The exhaust gas purified by the catalytic converter 141 is discharged to the outside air. The internal combustion engine system 21 also has an EGR pipe 142 connected with an exhaust pipe in the downstream of the catalytic converter 141 to recirculate the exhaust gas into a surge tank (air intake system), an EGR valve 143 provided in the middle of the EGR pipe 142 to regulate the recirculation amount (EGR amount) of the exhaust gas (EGR gas) recirculated from the exhaust system to the air intake system, and a temperature sensor 144 provided to measure the temperature of the EGR gas in the EGR pipe 142.

The engine 22 constructed as discussed above is under control of an engine electronic control unit (hereafter referred to as engine ECU) 24. As shown in FIG. 2, the engine ECU 24 is constructed as a microprocessor including a CPU 24a, a ROM 24b configured to store various processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 180 detected as the rotational position of the crankshaft 26, a cooling water temperature Tw from a water temperature sensor 181 measured as the temperature of cooling water in the engine 22, an in-cylinder pressure from an in-cylinder pressure sensor 182 detected as the internal pressure of the combustion chamber 120, cam positions from a cam position sensor 133 detected as the rotational positions of camshafts included in the valve operating mechanism 130 for operating the air intake valve 131 and the exhaust valve 132, a throttle position from a throttle valve position sensor 124 detected as the position of the throttle valve 123, an intake air flow GA or an amount of the intake air from an air flow meter 183 measured as the load of the engine 22, an intake air temperature Tair from an intake air temperature sensor 184 attached to the air intake pipe 126, a negative inspiratory pressure Pi from an inspiratory pressure sensor 185 detected as the negative pressure in the air intake pipe 126, an air-fuel ratio AF from an air-fuel ratio sensor 186 provided in the exhaust manifold 140 to be located in the upstream of the catalytic converter 141, and an EGR gas temperature from the temperature sensor 144 attached to the EGR pipe 142. The engine ECU 24 outputs, via its output port, diverse control signals and driving signals to drive and control the engine 22. The signals output from the engine ECU 24 include a driving signal to the fuel injection valve 127, a driving signal to a throttle motor 125 driven to regulate the position of the throttle valve 123, a control signal to an ignition coil 129 integrated with an igniter, a control signal to the valve operating mechanism 130, and a driving signal to the EGR valve 143. The engine ECU 24 establishes communication with the hybrid ECU 70 to control the operations of the engine 22 in response to control signals from the hybrid ECU 70 and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as the engine-side rotational element, the sun gear 31, and the ring gear 32 as the axle-side rotational element in the power distribution integration mechanism 30 are respectively linked to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 transmit electric power to and from a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereafter referred to as motor ECU). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotation speeds Nm1 and Nm2 of the rotors in the motors MG1 and MG2 according to a rotation speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is under control and management of a battery electronic control unit 52 (hereafter referred to as battery ECU). The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by data communication to the hybrid ECU 70 according to the requirements. The battery ECU 52 also performs various arithmetic operations for management and control of the battery 50. A remaining charge or state of charge SOC of the battery 50 is calculated from an integrated value of the charge-discharge current measured by the current sensor. A charge-discharge power demand Pb* is set based on the calculated state of charge SOC of the battery 50. An input limit Win as an allowable charging electric power to be charged in the battery 50 and an output limit Wout as an allowable discharging electric power to be discharged from the battery 50 are set corresponding to the calculated state of charge SOC and the battery temperature Tb. The input and output limits Win and Wout of the battery 50 are set by setting a basic value depending on the battery temperature Tb and setting an input limit correction coefficient and an output limit correction coefficient based on the state of charge SOC of the battery 50, and then multiplying the set basic value of the input and output limits Win and Wout by the set correction coefficient.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. The hybrid ECU 70 makes connection with the engine ECU 24, the motor ECU 40, and the battery ECU 52 via its communication port to transmit various control signals and data to and from the engine ECU 24, the motor ECU 40, and the battery ECU 52 as mentioned previously.

The hybrid vehicle 20 of the embodiment constructed as described above sets a torque demand Tr*, which is a torque to be output to the ring gear shaft 32a or the driveshaft linked with an axle of the hybrid vehicle 20, based on the vehicle speed V and the accelerator opening Acc corresponding to the driver's depression amount of the accelerator pedal 83, and controls the operations of the engine 22 and the motors MG1 and MG2 to ensure output of a torque equivalent to the preset torque demand Tr* to the ring gear shaft 32a. There are several drive control modes of the engine 22 and the motors MG1 and MG2. In a torque conversion drive mode, while the engine 22 is driven and controlled to ensure output of a power equivalent to the torque demand Tr*, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to ensure output of a power corresponding to the sum of the torque demand Tr* and an electric power required for charging the battery 50 or an electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30 and the motors MG1 and MG2 and to ensure output of a torque equivalent to the torque demand Tr* to the ring gear shaft 32a. In a motor drive mode, the motor MG2 is driven and controlled to ensure output of a power equivalent to the torque demand Tr* to the ring gear shaft 32a, while the engine 22 stops its operation.

Figure 3:
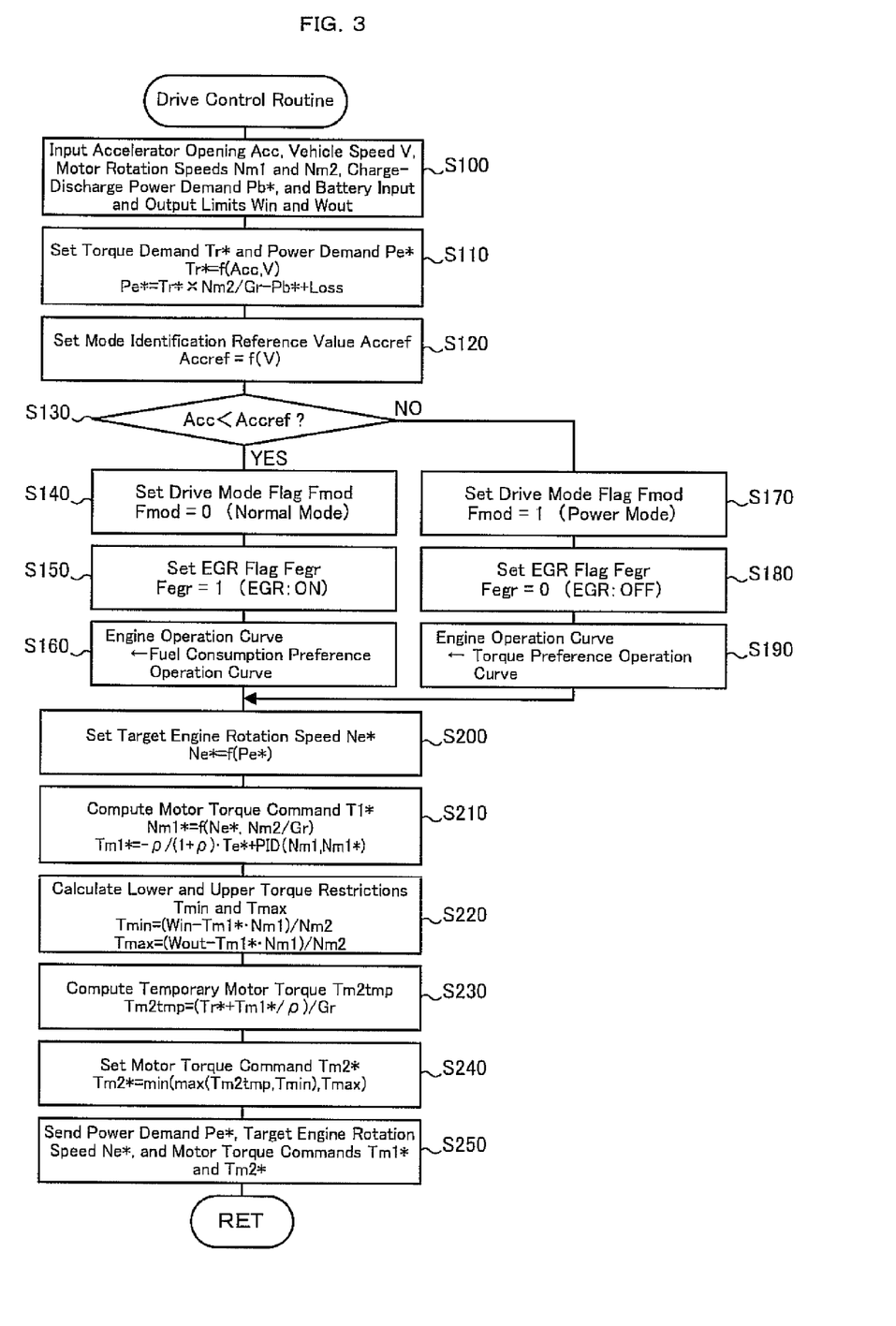
FIG. 3 is a flowchart showing a drive control routine executed by a hybrid ECU in the hybrid vehicle of the embodiment.

The description regards series of operations performed during a drive of the hybrid vehicle 20 of the embodiment having the configuration explained above. FIG. 3 is a flowchart showing a drive control routine during a drive of the hybrid vehicle 20 with operation of the engine 22, which is executed by the hybrid ECU 70 at preset time intervals, for example, at every several msec, in the embodiment.

Figure 4:
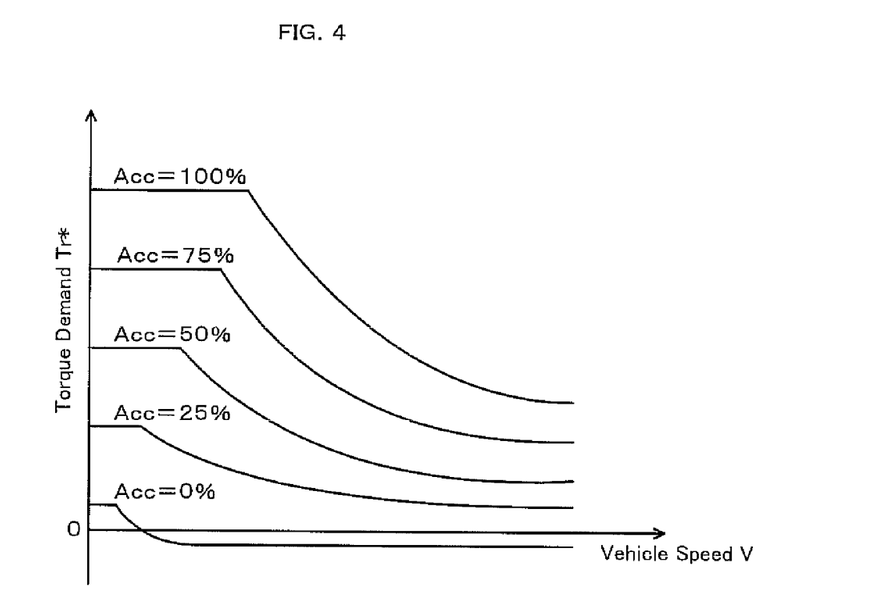
FIG. 4 shows one example of a torque demand setting map.

In the drive control routine of FIG. 3, the CPU 72 of the hybrid electronic control unit 70 first inputs various data required for control, for example, the accelerator opening Acc from the accelerator pedal position sensor 84, the vehicle speed V from the vehicle speed sensor 87, the rotation speeds Nm1 and Nm2 of the motors MG1 and MG2, the charge-discharge power demand Pb*, and the input limit Win and the output limit Wout of the battery 50 (step S100). The rotation speeds Nm1 and Nm2 of the motors MG1 and MG2 are input from the motor ECU 40 by communication, whereas the charge-discharge power demand Pb* and the battery input and output limits Win and Wout are input from the battery ECU 52 by communication. After the data input at step S100, the CPU 72 sets a torque demand Tr* to be output to the ring gear shaft 32a or the axle linked with the drive wheels 39a and 39b and a power demand Pe* required for the engine 22, based on the input accelerator opening Acc and the input vehicle speed V (step S110). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 4. The power demand Pe* of the embodiment represents a power required for the whole hybrid vehicle 20 and is computed as the sum of the product of the set torque demand Tr* and a rotation speed Nr of the ring gear shaft 32a, the charge-discharge power demand Pb*, and a potential loss. The rotation speed Nr of the ring gear shaft 32a is obtained by dividing the rotation speed Nm2 of the motor MG2 by a gear ratio Gr of the reduction gear 35 or by multiplying the vehicle speed V by a preset conversion factor k.

A mode identification reference value Accref is subsequently set, based on the vehicle speed V input at step S100 (step S120). The mode identification reference value Accref is used to selectively identify the drive mode of the hybrid vehicle 20 between a normal mode giving preference to the fuel consumption (energy efficiency) of the engine 22 over the torque output of the engine 22 and a power mode giving preference to the torque output of the engine 22 over the fuel consumption of the engine, by making a comparison with the accelerator opening Acc representing the driver's accelerator operation amount (accelerator depression amount). A concrete procedure of the embodiment provides and stores in advance a relation of the vehicle speed V to the mode identification reference value Accref as a mode identification reference value setting map (not shown) in the ROM 74 and reads and sets the mode identification reference value Accref corresponding to the given vehicle speed V from this map. The mode identification reference value Accref may be set in a range of about 50% to about 70% and may be set to increase with a decrease in accelerator opening Acc. After setting the mode identification reference value Accref, the CPU 72 determines whether the accelerator opening Acc input at step S100 is less than the set mode identification reference value Accref (step S130).

Upon determination at step S130 that the accelerator opening Acc is less than the mode identification reference value Accref, there is a relatively small accelerator depression amount by the driver. The driver is thus assumed to have a relatively small demand for torque output to the ring gear shaft 32a or the axle. When the accelerator opening Acc is less than the mode identification reference value Accref, a predetermined drive mode flag Fmod is set equal to 0 that represents selection of the normal mode giving preference to the fuel consumption as the drive mode of the hybrid vehicle 20 (step S140). A predetermined EGR flag Fegr is then set equal to 1 that represents permission for the exhaust gas recirculation via the EGR valve 143 with a view to improving the fuel consumption of the engine 22 (step S150). A fuel consumption preference operation curve (first drive point setting restriction) for defining drive points where the engine 22 is driven with high efficiency is set as an engine operation curve used for setting a target rotation speed Ne* and a target torque Te* specifying a target drive point of the engine 22 (step S160). Upon determination at step S130 that the accelerator opening Acc is not less than the mode identification reference value Accref, on the other hand, there is a relatively large accelerator depression amount by the driver. The driver is thus assumed to have a relatively large demand for torque output to the ring gear shaft 32a or the axle. When the accelerator opening Acc is not less than the mode identification reference value Accref, the predetermined drive mode flag Fmod is set equal to 1 that represents selection of the power mode giving preference to the torque output as the drive mode of the hybrid vehicle 20 (step S170). The predetermined EGR flag Fegr is then set equal to 0 that represents prohibition for the exhaust gas recirculation via the EGR valve 143 (step S180). A torque preference operation curve (second drive point setting restriction) giving preference to the torque output of the engine 22 over the fuel consumption of the engine 22 is set as the engine operation curve (step S190).

Figure 5:
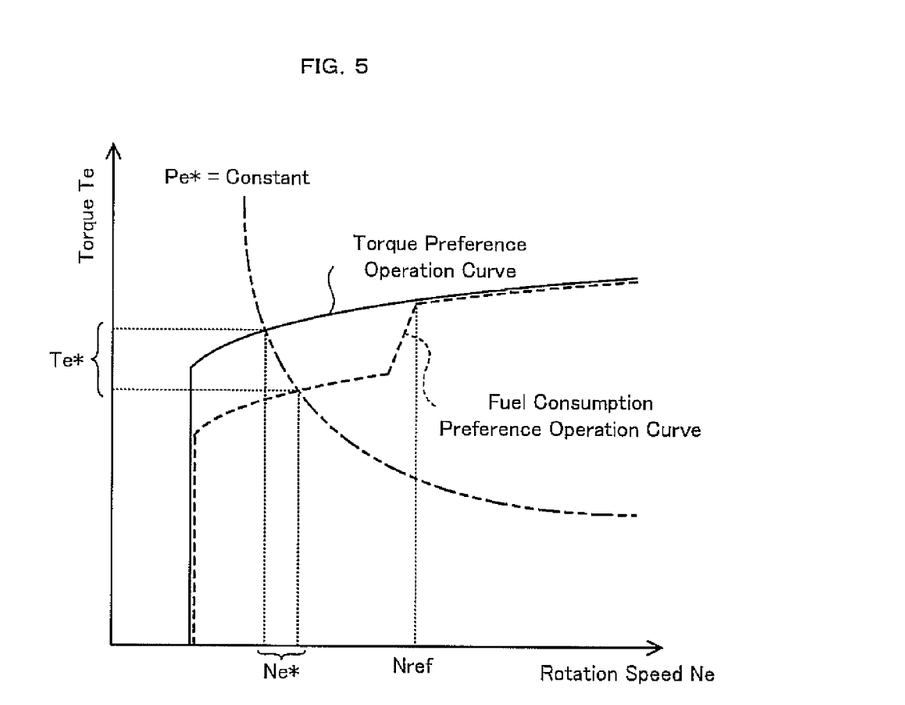
FIG. 5 shows a fuel consumption preference operation curve and a torque preference operation curve with a correlation curve of constant power demand Pe*.

After setting the engine operation curve either at step S160 or at step S190, the CPU 72 sets the target rotation speed Ne* of the target drive point of the engine 22, based on the power demand Pe* set at step S110 (step S200). In the case of setting the fuel consumption preference operation curve as the engine operation curve at step S160, the processing of step S200 sets the target rotation speed Ne* of the engine 22 to a rotation speed corresponding to an intersection between a correlation curve of constant power demand Pe* (=Ne*×Te*) and the fuel consumption preference operation curve shown in FIG. 5 (a broken line curve in FIG. 5). In the case of setting the torque preference operation curve as the engine operation curve at step S190, on the other hand, the processing of step S200 sets the target rotation speed Ne* of the engine 22 to a rotation speed corresponding to an intersection between the correlation curve of constant power demand Pe* and the torque preference operation curve shown in FIG. 5 (a solid line curve in FIG. 5). As shown in FIG. 5, the torque preference operation curve of the embodiment defines the relation between the target rotation speed Ne* and the target torque Te* of the engine 22 that ensures output of a relatively large torque from the engine 22, while maintaining the efficiency (fuel consumption) at a relatively high level in an ordinary rotation speed range. The fuel consumption preference operation curve of the embodiment defines the relation between the target rotation speed Ne* of the engine 22 and the power demand Pe* that slightly restricts the torque output from the engine 22, while improving the fuel consumption in a specific rotation speed range of not higher than a relatively high reference rotation speed Nref (for example, 4000 to 5000 rpm).

After setting the target rotation speed Ne* of the engine 22, the CPU 72 calculates a target rotation speed Nm1* of the motor MG1 from the set target rotation speed Ne*, the rotation speed Nr (=Nm2/Gr) of the ring gear shaft 32a, and a gear ratio ρ of the power distribution integration mechanism 30 (a ratio of the number of teeth of the sun gear 31 to the number of teeth of the ring gear 32) according to Equation (1) given below and subsequently computes a torque command Tm1* of the motor MG1 from the target torque Te* of the engine 22 and the calculated target rotation speed Nm1* and the current rotation speed Nm1 of the motor MG1 according to Equation (2) given below (step S210):

$$Nm1^* = Ne^* \cdot (1+\rho)/\rho - Nm2/(Gr \cdot \rho) \quad (1)$$

$$Tm1^* = -\rho/(1+\rho) \cdot Te^* + k1 \cdot (Nm1^* - Nm1) + k2 \cdot \int (Nm1^* - Nm1) dt \quad (2)$$

Figure 6:
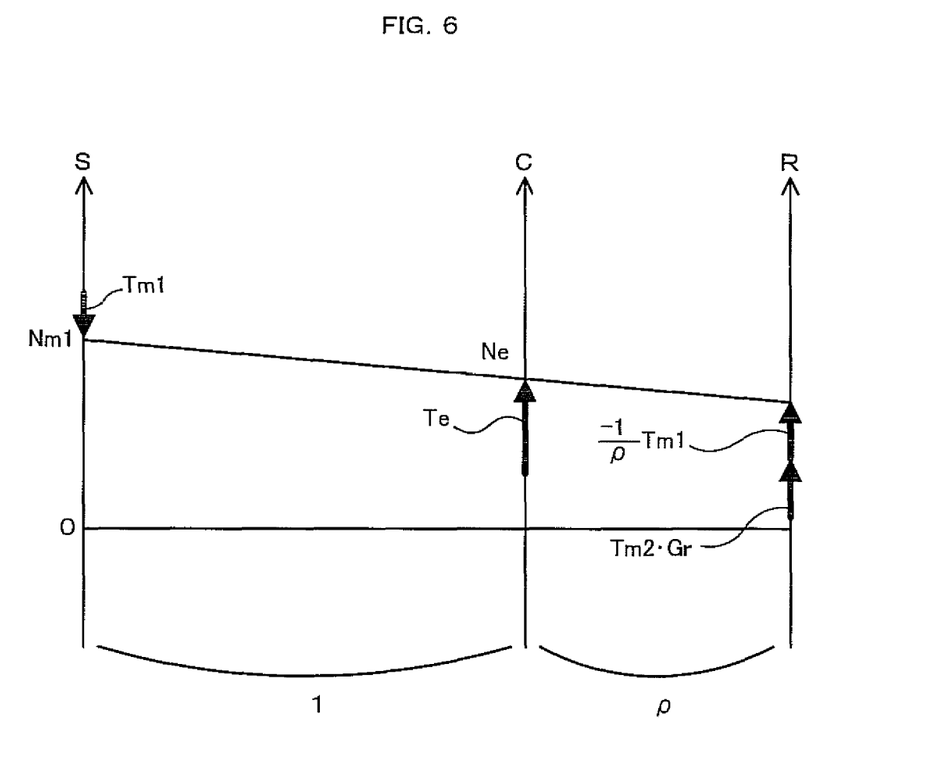
FIG. 6 is an alignment chart showing torque-rotation speed dynamics of respective rotational elements included in a power distribution integration mechanism during drive of the hybrid vehicle with operation of an engine.

Equation (1) is a dynamic relational expression of respective rotational elements included in the power distribution integration mechanism 30. FIG. 6 is an alignment chart showing torque-rotation speed dynamics of the respective rotational elements included in the power distribution integration mechanism 30. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (1) for computation of the target rotation speed Nm1* of the motor MG1 is readily obtained by taking into account the rotation speed relation in the alignment chart of FIG. 6. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After computation of the torque command Tm1* of the motor MG1, the CPU 72 calculates a lower torque restriction Tmin and an upper torque restriction Tmax as allowable minimum and maximum torques to be output from the motor MG2 from the input and output limits Win and Wout of the battery 50, the torque command Tm1* of the motor MG1 set at step S210, and the current rotation speeds Nm1 and Nm2 of the motors MG1 and MG2 according to Equations (3) and (4) given below (step S220):

$$Tmin = (Win - Tm1^* \cdot Nm1)/Nm2 \quad (3)$$

$$Tmax = (Wout - Tm1^* \cdot Nm1)/Nm2 \quad (4)$$

The CPU 72 then calculates a temporary motor torque Tm2tmp as a provisional torque value to be output from the motor MG2, from the torque demand Tr*, the torque command Tm1* of the motor MG1, the gear ratio ρ of the power distribution integration mechanism 30, and the gear ratio Gr of the reduction gear 35 according to Equation (5) given below (step S230):

$$Tm2tmp = (Tr^* + Tm1^*/\rho)/Gr \quad (5)$$

The CPU 72 then sets a torque command Tm2* of the motor MG2 to a value obtained by limiting the calculated temporary motor torque Tm2tmp by the lower and the upper torque restrictions Tmin and Tmax (step S240). Setting the torque command Tm2* of the motor MG2 in this manner restricts the torque to be output to the ring gear shaft 32a or the axle in the range of the input limit Win and the output limit Wout of the battery 50. Equation (5) is readily introduced from the alignment chart of FIG. 6. After setting the power demand Pe* and the target rotation speed Ne* of the engine 22 and the torque commands Tm1* and Tm2* of the motors MG1 and MG2, the CPU 72 sends the power demand Pe* and the target rotation speed Ne* of the engine 22 to the engine ECU 24 and the torque commands Tm1* and Tm2* of the motors MG1 and MG2 to the motor ECU 40 (step S250) and returns to step S100 to repeat the processing of and after step S100. The motor ECU 40 receives the settings of the torque commands Tm1* and Tm2* and performs switching control of switching elements included in the respective inverters 41 and 42 to operate the motor MG1 with the torque command Tm1* and the motor MG2 with the torque command Tm2*. The engine ECU 24 receives the settings of the power demand Pe* and the target rotation speed Ne* and computes the target torque Te* of the engine 22 by dividing the power demand Pe* by the target rotation speed Ne*. The engine ECU 24 sets a target intake air flow GA* based on the target rotation speed Ne* and the target torque Te* of the engine 22 and subsequently sets a target opening TH* of the throttle valve 123 based on the set target intake air flow GA*. The engine ECU 24 then controls the throttle motor 125 based on the throttle valve position input from the throttle valve position sensor 124 to make the opening of the throttle valve 123 approach to the target opening TH*. The engine ECU 24 also performs fuel injection control, ignition timing control, valve timing control, and exhaust gas recirculation control (hereafter referred to as 'EGR control'), in addition to such throttle opening control.

Figure 7:
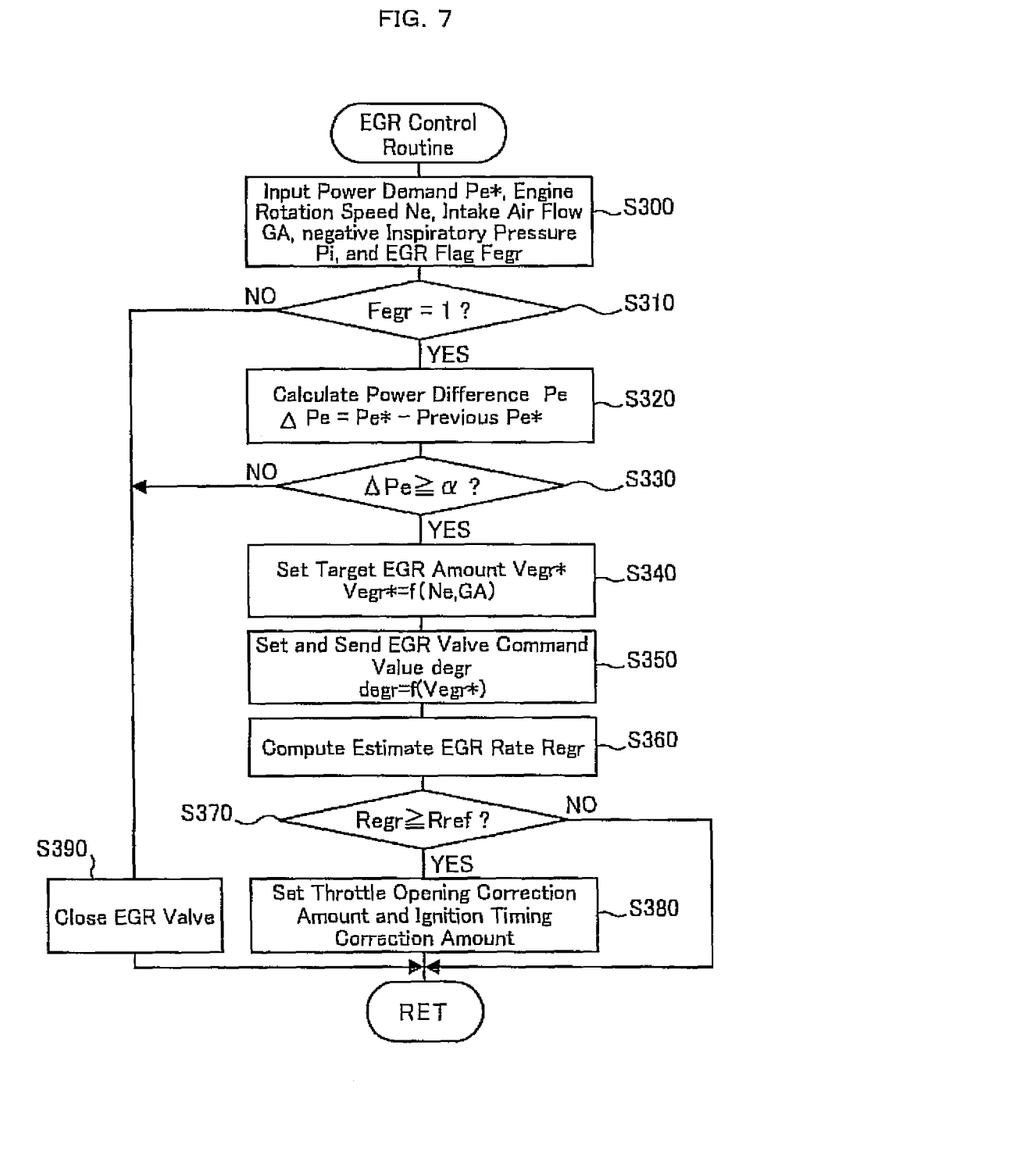
FIG. 7 is a flowchart showing an EGR control routine executed by an engine ECU in the hybrid vehicle of the embodiment.

The EGR control performed by the engine ECU 24 is discussed below. FIG. 7 is a flowchart showing an EGR control routine executed by the engine ECU 24. This EGR control routine is repeatedly performed at preset time intervals by the engine ECU 24 after a start of the engine 22 and completion of the warm-up of the engine 22.

In the EGR control routine of FIG. 7, the CPU 24a of the engine ECU 24 first inputs various data required for control, for example, the power demand Pe* sent from the hybrid ECU 70, a rotation speed Ne of the engine 22 (equivalent to the rotation speed of the crankshaft 26), the intake air flow GA from the air flow meter 183, the negative inspiratory pressure Pi from the inspiratory pressure sensor 185, and the setting of the EGR flag Fegr (step S300). The procedure of the embodiment inputs the rotation speed Ne of the engine 22 that is separately calculated from the crank position sent from the crank position sensor 180 and stored in a specific storage area. The setting of the EGR flag Fegr is input from the hybrid ECU 70 by communication. After the data input at step S300, the CPU 24a identifies whether the input EGR flag Fegr is equal to 1 (step S310). Upon identification of the EGR flag Fegr equal to 1 that represents permission for the exhaust gas recirculation via the EGR valve 143 (upon satisfaction of an exhaust gas recirculation condition), a power difference ΔPe is calculated by subtracting a previous power demand Pe* (previous Pe*) input before start of this routine or input in a previous cycle of this routine from the current power demand Pe* input at step S300 in the current cycle of this routine (step S320). It is then determined whether the calculated power difference ΔPe is not less than a preset reference value α that is a negative value (step S330). The power difference ΔPe as the result of subtraction of the previous power demand Pe* from the current power demand Pe* has a positive value in response to the driver's depression of the accelerator pedal 83 to show an increase rate of the power demand Pe* per unit time (execution period of this routine), while having a negative value in response to the driver's release of the depressed accelerator pedal 83 to show a decrease rate of the power demand Pe* per unit time. On the basis of such indication, the reference value α used for the comparison at step S330 is a preset negative value having a relatively large absolute value. In order to identify whether the driver's accelerator operation suggests a relatively high deceleration demand based on the power difference ΔPe, the reference value α is set through experiments and analyses that take into consideration the throttle opening corresponding to the power demand Pe* and the target rotation speed Ne* of the engine 22 and a correlation of the variation in throttle opening to the variation in power demand Pe*.

Upon determination at step S330 that the power difference ΔPe is not less than the preset reference value α, that is, in response to the decrease rate of the power demand Pe* that is not higher than a predetermined rate corresponding to the reference value α and suggests the driver's relatively low deceleration demand, a target EGR amount (target recirculation amount) Vegr* is set as a target amount of the EGR gas to be recirculated into the air intake system, based on the rotation speed Ne of the engine 22 and the intake air flow GA (step S340). A concrete procedure of setting the target EGR amount Vegr* in this embodiment provides and stores in advance a variation in target EGR amount Vegr* against the rotation speed Ne of the engine 22 and against the intake air flow GA through experiments and analyses as a target EGR amount setting map (not shown) in the ROM 24b and reads the target EGR amount Vegr* corresponding to the given rotation speed Ne and the given intake air flow GA from this map. The target EGR amount setting map of this embodiment is designed to set the target EGR amount Vegr* equal to 0 when the load of the engine 22 (intake air flow GA) is lower than a preset reference level. Such setting of the target EGR amount Vegr* aims to prohibit the exhaust gas recirculation via the EGR valve 143. The parameters of the target EGR amount setting map are not restricted only to the rotation speed Ne of the engine 22 and the intake air flow GA. Any additional or alternative parameters may be used as long as they ensure adequate setting of the EGR rate according to the operating conditions of the engine 22. After setting the target EGR amount Vegr*, the CPU 24a refers to a map (not shown) to set a command value degr (command duty ratio) of the EGR valve 143 corresponding to the set target EGR amount Vegr* and sends the setting of the command value degr of the EGR valve 143 to an actuator (not shown) of the EGR valve 143, for example, a step motor (step S350).

An estimate EGR rate Regr is computed from the intake air flow GA input at step S300 and the target EGR amount Vegr* set at step S340 (step S360). It is then determined that the computed estimate EGR rate Regr is not lower than a preset reference rate Rref, for example, 10% (step S370). When it is determined at step S370 that the computed estimate EGR rate Regr is not lower than the preset reference rate Rref, the CPU 24a sets a correction amount of the opening of the throttle valve 123 or a throttle opening correction amount and a correction amount of the ignition timing of the engine 22 or an ignition timing correction amount (step S380) and exits from this EGR control routine. A concrete procedure of setting the throttle opening correction amount in this embodiment reads and sets a throttle opening correction amount corresponding to the negative inspiratory pressure Pi input at step S300 and the target EGR amount Vegr* set at step S340 from a map (not shown) provided and stored in advance. The throttle opening correction amount is basically set to increase the throttle opening with an increase of the target EGR amount Vegr*, in order to improve the fuel consumption due to reduction of a potential pumping loss. A concrete procedure of setting the ignition timing correction amount in this embodiment reads and sets an ignition timing correction amount corresponding to the target EGR amount Vegr* set at step S340 from a map (not shown) provided and stored in advance. The ignition timing correction amount is basically set to advance the ignition timing with an increase of the target EGR amount Vegr*, in order to prevent a delay of combustion of the air-fuel mixture in the combustion chamber 120. The throttle opening correction amount and the ignition timing correction amount setting in this manner are referred to in throttle opening control and ignition timing control separately performed by the engine ECU 24. When it is determined at step S370 that the computed estimate EGR rate Regr is lower than the preset reference rate Rref, the CPU 24a skips the processing of step S380 and exits from the EGR control routine.

Upon identification of the EGR flag Fegr equal to 0 at step S310 that represents prohibition for the exhaust gas recirculation via the EGR valve 143 (upon dissatisfaction of the exhaust gas recirculation condition), on the other hand, the CPU 24a sets the command value degr (command duty ratio) of the EGR valve 143 to close the EGR valve 143 or to keep the EGR valve 143 in the closed position and sends the setting of the command value degr of the EGR valve 143 to the actuator (not shown) of the EGR valve 143, for example, the step motor (step S390). The EGR control routine is then terminated. Upon determination at step S330 that the power difference ΔPe is less than the preset reference value α, the CPU 24a also sets the command value degr (command duty ratio) of the EGR valve 143 to close the EGR valve 143 or to keep the EGR valve 143 in the closed position and sends the setting of the command value degr of the EGR valve 143 to the actuator (not shown) of the EGR valve 143, for example, the step motor (step S390). The EGR control routine is then terminated. Namely in response to the decrease rate of the power demand Pe* that is higher than the predetermined rate corresponding to the reference value α and suggests the driver's relatively high deceleration demand, the engine 22 is controlled to output a power equivalent to the power demand Pe* with prohibiting the exhaust gas recirculation via the EGR valve 143.

In the hybrid vehicle 20 of the embodiment, in response to the driver's relatively large depression amount of the accelerator pedal 83, the engine ECU 24 controls the throttle motor 125 to set the opening of the throttle valve 123 to a basically full-open position, based on the power demand Pe* (target torque Te*) and the target rotation speed Ne* of the engine 22. In this state, in response to the driver's abrupt release of the depressed accelerator pedal 83 (accelerator-off) suggesting the driver's relatively high deceleration demand, the engine ECU 24 controls the throttle motor 125 to quickly set the opening of the throttle valve 123 to a full-closed position. In the process of abruptly closing the throttle valve 123 in response to the driver's relatively high deceleration demand, a preferable procedure stops the exhaust gas recirculation via the EGR valve 143, so as to effectively prevent the occurrence of an engine misfire caused by the exhaust gas remaining in the air intake system. In the case of the driver's accelerator-off from the state of a relatively small depression amount of the accelerator pedal 83, that is, in the case of the driver's gentle release of the accelerator pedal 83 suggesting the driver's relatively low deceleration demand, there is an extremely low potential for the occurrence of an engine misfire even in continuation of the exhaust gas recirculation via the EGR valve 143. In the case of a change in opening of the throttle valve 123 from an open position to a closing position due to a change of the drive point of the engine 22 for charging the battery 50, there is also an extremely low potential for the occurrence of an engine misfire even in continuation of the exhaust gas recirculation via the EGR valve 143. Prohibition of the exhaust gas recirculation via the EGR valve 143 naturally loses the advantage of the recirculation. The hybrid vehicle 20 of the embodiment accordingly sets a negative value having a relatively high absolute value to the reference value α used for the comparison at step S330 by taking into consideration the throttle opening corresponding to the power demand Pe* and the correlation of the variation in throttle opening to the variation in power demand Pe*. When the power difference ΔPe is not less than the preset reference value α, the EGR control permits the exhaust gas recirculation via the EGR valve 143. When the power difference ΔPe is less than the preset reference value α, on the other hand, the EGR control prohibits the exhaust gas recirculation via the EGR valve 143.

As described above, the hybrid vehicle 20 of the embodiment sets the torque demand Tr* required for driving according to the driver's accelerator operation and sets the power demand Pe* required for the engine 22 based on the set torque demand Tr* (step S110 in FIG. 3). After completion of the warm-up of the engine 22, upon satisfaction of the exhaust gas recirculation condition by setting the drive mode of the hybrid vehicle 20 to the normal mode according to the driver's accelerator operation, when the power difference ΔPe is not less than the preset reference value α (when the decrease rate of the power demand Pe* is not higher than the predetermined rate corresponding to the reference value α, the engine 22 and the motors MG1 and MG2 are controlled to ensure output of a power equivalent to the power demand Pe* from the engine 22 with the exhaust gas recirculation via the EGR valve 143 from the exhaust system to the air intake system and to ensure output of a torque equivalent to the torque demand Tr* to the ring gear shaft 32a or the axle (steps S120 to S250 in FIG. 3 and steps S300 to S380 in FIG. 7). After completion of the warm-up of the engine 22, upon satisfaction of the exhaust gas recirculation condition by setting the drive mode of the hybrid vehicle 20 to the normal mode according to the driver's accelerator operation, when the power difference ΔPe is less than the preset reference value α (when the decrease rate of the power demand Pe* is higher than the predetermined rate corresponding to the reference value α), on the other hand, the engine 22 and the motors MG1 and MG2 are controlled to ensure output of a power equivalent to the power demand Pe* from the engine 22 without the exhaust gas recirculation via the EGR valve 143 from the exhaust system to the air intake system and to ensure output of a torque equivalent to the torque demand Tr* to the ring gear shaft 32a or the axle (steps S120 to S250 in FIG. 3 and steps S300 to S330 and step S390 in FIG. 7).

The power difference ΔPe representing the decrease rate of the power demand Pe* based on the torque demand Tr*, which is set according to the driver's accelerator operation, adequately indicates the degree of the driver's deceleration demand by the driver's accelerator operation. The control procedure controls the opening of the throttle valve 123 for the engine 22 based on the power demand Pe* and the target rotation speed Ne*, so as to ensure output of a power equivalent to the power demand Pe* from the engine 22. The permission or the prohibition for the exhaust gas recirculation is determined, based on the result of the comparison between the power difference ΔPe representing the decrease rate of the power demand Pe*, which reflects the operating condition of the engine 22, and the preset reference value α (predetermined rate). The reference value α is adequately set by taking into consideration the throttle opening corresponding to the power demand Pe* and the target rotation speed Ne* of the engine 22 and the correlation of the variation in throttle opening to the variation in power demand Pe*. Adequate setting of the reference value α in this manner desirably prevents restriction of the exhaust gas recirculation beyond necessity, while effectively stopping the exhaust gas recirculation when there is a potential for the occurrence of an engine misfire caused by the exhaust gas remaining in the air intake system, for example, on the occasion of the driver's deceleration demand. The power demand Pe* is not an observed value but a command value, unlike the opening of the throttle valve 123. The simple comparison between the power difference ΔPe representing the decrease rate of the power demand Pe* and the preset reference value α ensures the highly responsive identification of the permission or the prohibition for the exhaust gas recirculation to the driver's accelerator operation. The hybrid vehicle 20 of the embodiment thus adequately performs the exhaust gas recirculation via the EGR valve 143 and thereby effectively prevents the occurrence of a misfire of the engine 22 caused by the exhaust gas recirculation.

The hybrid vehicle 20 of the embodiment sets the target EGR amount Vegr* of the exhaust gas, which is to be recirculated from the exhaust system to the air intake system, corresponding to the load (intake air flow GA) and the rotation speed Ne of the engine 22 by referring to the target EGR amount setting map. The target EGR amount setting map specifies the target EGR amount Vegr* to prohibit the exhaust gas recirculation when the load of the engine 22 (intake air flow GA) is lower than the preset reference level. Upon satisfaction of the exhaust gas recirculation condition, when the power difference ΔPe becomes less than the preset reference value α in response to the driver's deceleration demand, the exhaust gas recirculation via the EGR valve 143 is temporarily stopped. Upon satisfaction of the exhaust gas recirculation condition, even when the power difference ΔPe reaches or exceeds the preset reference value α immediately after the temporal stop, the prohibition for the exhaust gas recirculation via the EGR valve 143 basically continues until the driver's depression of the accelerator pedal 83, since the target EGR amount Vegr* is set equal to 0 accompanied with the decrease of the throttle opening.

When the accelerator opening Acc representing the driver's accelerator operation amount is less than the mode identification reference value Accref corresponding to the vehicle speed V to set the drive mode of the hybrid vehicle 20 to the normal mode giving preference to the fuel consumption, the control procedure of the embodiment permits the exhaust gas recirculation via the EGR valve 143. When the accelerator opening Acc is not less than the mode identification reference value Accref to set the drive mode of the hybrid vehicle 20 to the power mode giving preference to the torque output, the control procedure of the embodiment prohibits the exhaust gas recirculation via the EGR valve 143. The EGR control is, however, not restricted to this procedure. In the hybrid vehicle of one modified structure equipped with a switch for allowing the driver's selection of the drive mode of the hybrid vehicle between the normal mode giving preference to the fuel consumption and the power mode giving preference to the torque output, the exhaust gas recirculation via the EGR valve 143 is permitted in response to the driver's switch operation of selectively setting the drive mode to the normal mode. The exhaust gas recirculation via the EGR valve 143 is prohibited in response to the driver's switch operation of selectively setting the drive mode to the power mode.

Figure 8:
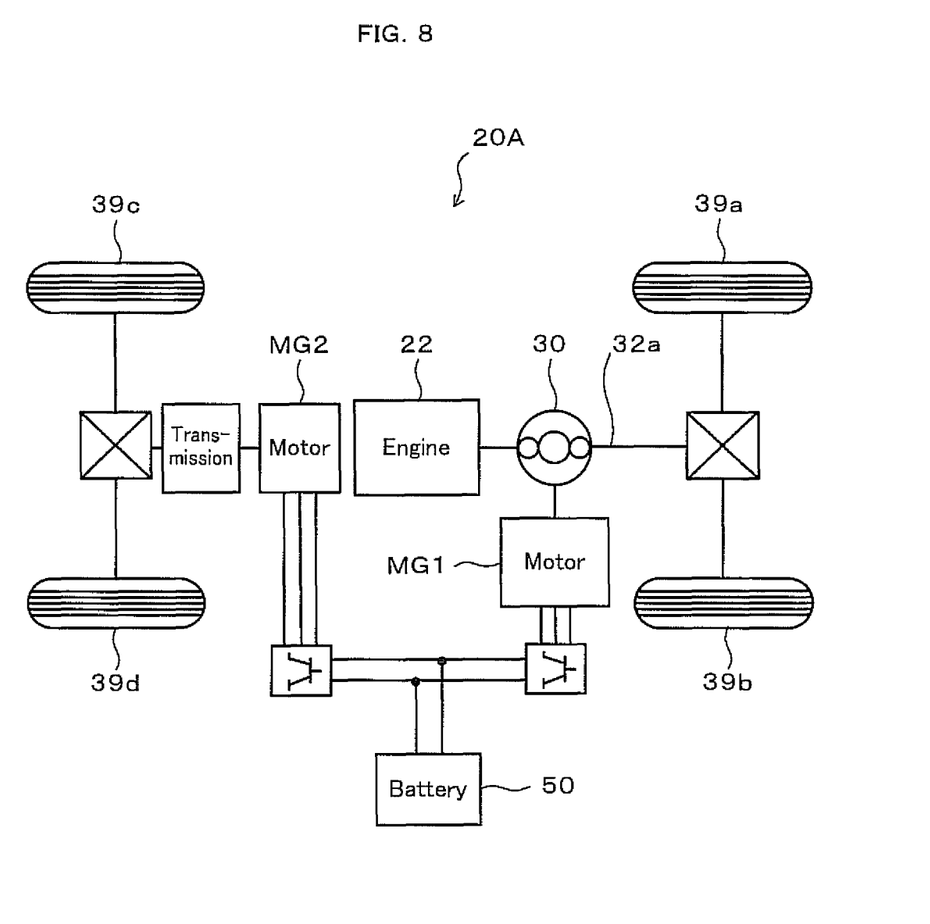
FIG. 8 schematically illustrates the configuration of another hybrid vehicle in one modified example.
Figure 9:
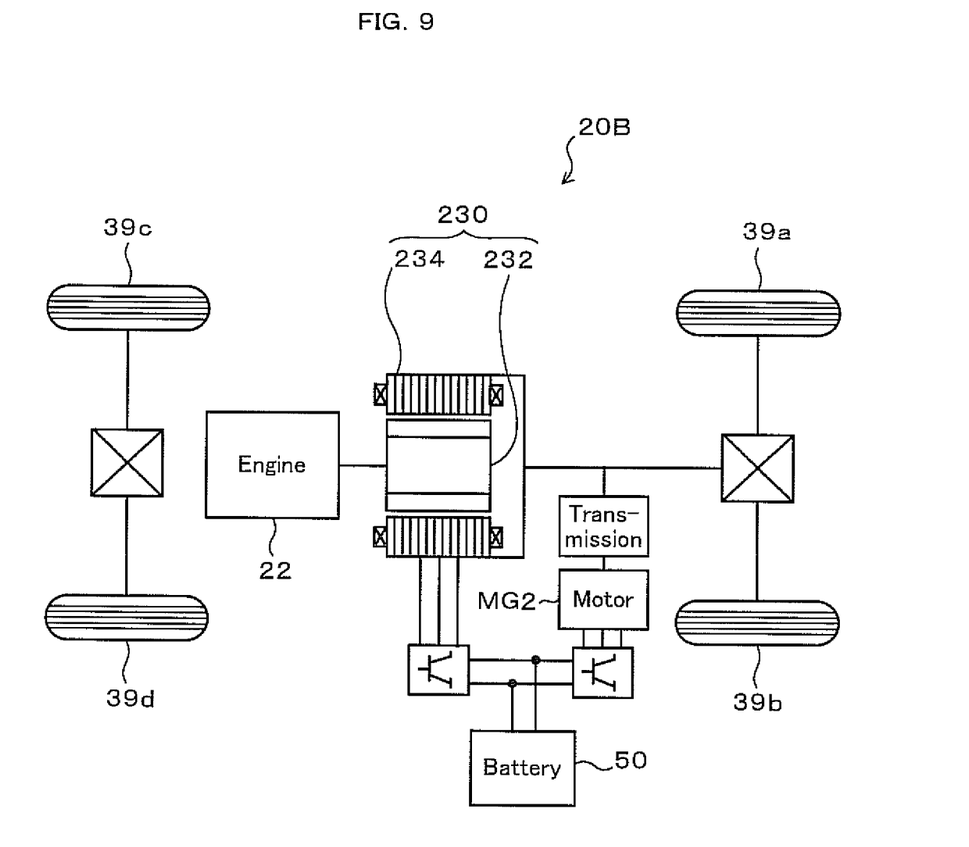
FIG. 9 schematically illustrates the configuration of still another hybrid vehicle in another modified example.

In the hybrid vehicle 20 of the above embodiment, the ring gear shaft 32a or the axle is linked with the motor MG2 via the reduction gear 35 that reduces the rotation speed of the motor MG2 and transmits the reduced rotation speed to the ring gear shaft 32a. The reduction gear 35 may be replaced with a transmission that has two different speeds Hi and Lo or three or a greater number of different speeds and is designed to change the rotation speed of the motor MG2 and transmits the changed rotation speed to the ring gear shaft 32a. In the hybrid vehicle 20 of the embodiment, the power of the motor MG2 is output to the axle connecting with the ring gear shaft 32a. The technique of the invention is, however, not restricted to the hybrid vehicle of this configuration but is also applicable to a hybrid vehicle 20A of a modified configuration shown in FIG. 8. In the hybrid vehicle 20A of FIG. 8, the power of the motor MG2 is output to another axle (an axle linked with wheels 39c and 39d) that is different from the axle connecting with the ring gear shaft 32a (the axle linked with the wheels 39a and 39b). In the hybrid vehicle 20 of the embodiment, the power of the engine 22 is output via the power distribution integration mechanism 30 to the ring gear shaft 32a or the axle linked with the wheels 39a and 39b. The technique of the invention is, however, not restricted to the hybrid vehicle of this configuration but is also applicable to a hybrid vehicle 20B of another modified configuration shown in FIG. 9. The hybrid vehicle 20B of FIG. 9 is equipped with a pair-rotor motor 230. The pair-rotor motor 230 includes an inner rotor 232 connected to the crankshaft of the engine 22 and an outer rotor 234 connected to an axle for outputting power to the wheels 39a and 39b. The pair-rotor motor 230 transmits part of the output power of the engine 22 to the axle, while converting the residual engine output power into electric power.

The primary elements in the embodiment and its modified examples are mapped to the primary constituents in the claims of the invention as described below. The engine 22 equipped with the EGR pipe 142 connected with the exhaust pipe to recirculate the exhaust gas to the surge tank and with the EGR valve 143 provided in the middle of the EGR pipe 142 to regulate the recirculation amount of the exhaust gas in the embodiment and the modified examples corresponds to the 'internal combustion engine' in the claims of the invention. The motor MG2 designed to input and output power from and to the ring gear shaft 32a or the axle and the battery 50 arranged to transmit electric power to and from the motor MG2 in the embodiment and the modified examples respectively correspond to the 'motor' and the 'accumulator' in the claims of the invention. The hybrid ECU 70 executing the processing of step S110 in the drive control routine of FIG. 3 in the embodiment is equivalent to the 'driving force demand setting module' and the 'engine power demand setting module' in the claims of the invention. The engine ECU 24 executing the processing of step S320 in the EGR control routine of FIG. 8 in the embodiment is equivalent to the 'power decrease rate acquisition module' in the claims of the invention. The combination of the hybrid ECU 70 executing the drive control routine of FIG. 3 with the motor ECU 40 and the engine ECU 24 executing the EGR control routine of FIG. 7 in the embodiment is equivalent to the 'controller' in the claims of the invention. The hybrid ECU 70 executing the processing of step S200 in the drive control routine of FIG. 3 in the embodiment is equivalent to the 'target engine rotation speed setting module' in the claims of the invention. The engine ECU 24 setting the target opening TH* of the throttle valve 123 based on the power demand Pe* and the target rotation speed Ne* of the engine 22 and controlling the actuator for the throttle valve 123 based on the set target opening TH* in the embodiment is equivalent to the 'target throttle opening setting module' and the 'throttle controller' in the claims of the invention. The combination of the motor MG1 with the power distribution integration mechanism 30 in the embodiment or the pair-rotor motor 230 in the modified example corresponds to the 'electric power-dynamic power input output structure' in the claims of the invention. The motor MG1 in the embodiment corresponds to the 'motor for power generation' in the claims of the invention. The power distribution integration mechanism 30 in the embodiment corresponds to the 'three shaft-type power input output assembly' in the claims of the invention.

The 'internal combustion engine' is not restricted to the engine 22 designed to consume a hydrocarbon fuel, such as gasoline or light oil, and output power, but may be an engine of any other suitable design, for example, a hydrogen engine. The 'motor' and the 'motor for power generation' are not restricted to the motor MG2 and the motor MG1 constructed as synchronous motor generators but may be motors of any other suitable design or configuration, for example, induction motors. The 'accumulator' is not restricted to the battery 50 constructed as a secondary battery but may be any other power storable structure designed to transmit electric power from and to a motor, for example, a capacitor. The 'driving force demand setting module' is not restricted to the configuration of setting a torque demand as a driving force demand based on the accelerator opening and the vehicle speed but may be any other suitable configuration of, for example, setting a driving force demand based on only the accelerator opening. The 'engine power demand setting module' may be any configuration of setting an engine power demand required for the internal combustion engine based on the set driving force demand. The 'power decrease rate acquisition module' may be any configuration of acquiring a decrease rate of the engine power demand. The 'controller' is not restricted to the combination of the hybrid ECU 70 with the engine ECU 24 and the motor ECU 40 but may be actualized by any other configuration or design, for example, a single electronic control unit. The above mapping of the primary elements in the embodiment and its modified examples to the primary constituents in the claims of the invention is not restrictive in any sense but is only illustrative for concretely describing the modes of carrying out the invention. The scope and spirit of the present invention are indicated by the appended claims, rather than by the foregoing description.

The embodiment and its modified examples discussed above are to be considered in all aspects as illustrative and not restrictive. There may be many other modifications, changes, and alterations without departing from the scope or spirit of the main characteristics of the present invention.

The technique of the present invention is preferably applied to the manufacturing industries of the hybrid vehicles.

The disclosure of Japanese Patent Application No. 2008-141341 filed on May 29, 2008 including specification, drawings and claims is incorporated herein by reference in its entirety.

The invention claimed is:

1. A hybrid vehicle having an internal combustion engine designed to output driving power and equipped with an exhaust gas recirculation structure arranged to recirculate an exhaust gas from an exhaust system to an air intake system, a motor designed to output driving power, and an accumulator designed to transmit electric power to and from the motor, the hybrid vehicle comprising:

a driving force demand setting module configured to set a driving force demand required for driving the hybrid vehicle, in response to a driver's accelerator operation;

an engine power demand setting module configured to set an engine power demand required for the internal combustion engine, based on the set driving force demand;

a power decrease rate acquisition module configured to acquire a decrease rate of the engine power demand; and a controller configured to control the internal combustion engine and the motor so that the internal combustion engine outputs a power equivalent to the set engine power demand with exhaust gas recirculation from the exhaust system to the air intake system by means of the exhaust gas recirculation structure and a driving power equivalent to the set driving force demand is ensured when a preset exhaust gas recirculation condition is satisfied and the acquired decrease rate of the engine power demand is not higher than a predetermined rate, the controller controlling the internal combustion engine and the motor so that the internal combustion engine outputs a power equivalent to the set engine power demand without the exhaust gas recirculation and the driving power equivalent to the set driving force demand is ensured when the preset exhaust gas recirculation condition is satisfied and the acquired decrease rate of the engine power demand is higher than the predetermined rate.

2. The hybrid vehicle in accordance with claim 1, the hybrid vehicle further comprising:

a target engine rotation speed setting module configured to set a target rotation speed of the internal combustion engine, based on the set engine power demand and a predetermined drive point setting restriction;

a target throttle opening setting module configured to set a target opening of a throttle valve included in the internal combustion engine, based on the set engine power demand and the set target rotation speed of the internal combustion engine; and a throttle controller configured to control the throttle valve to make an opening of the throttle valve sufficiently close to the set target opening.

3. The hybrid vehicle in accordance with claim 1, the hybrid vehicle further comprising:

a target recirculation amount setting module configured to, when the preset exhaust gas recirculation condition is satisfied and the acquired decrease rate of the engine power demand is not higher than a predetermined rate, set a target recirculation amount of the exhaust gas, which is to be recirculated from the exhaust system to the air intake system by means of the exhaust gas recirculation structure, based on a load and a rotation speed of the internal combustion engine.

4. The hybrid vehicle in accordance with claim 1, the hybrid vehicle further comprising:

an electric power-dynamic power input output structure connected with an engine shaft of the internal combustion engine and with a preset axle and configured to input and output power from and to the engine shaft and the preset axle accompanied with input and output of electric power and dynamic power and to transmit electric power to and from the accumulator, wherein the motor is arranged to input and output power from and to either the preset axle or another axle different from the preset axle.

5. The hybrid vehicle in accordance with claim 4, wherein the electric power-dynamic power input output structure includes:

a motor for power generation designed to input and output power; and a three shaft-type power input output assembly connected with three shafts, the preset axle, the engine shaft of the internal combustion engine, and a rotating shaft of the motor for power generation, the three shaft-type power input output assembly configured to input and output power from and to one remaining shaft, based on input and output of powers from and to any two shafts selected among the three shafts.

6. A control method of a hybrid vehicle having an internal combustion engine designed to output driving power and equipped with an exhaust gas recirculation structure arranged to recirculate an exhaust gas from an exhaust system to an air intake system, a motor designed to output driving power, and an accumulator designed to transmit electric power to and from the motor, the method comprising the steps of:

(a) providing an electronic control unit;

(b) setting a driving force demand required for driving the hybrid vehicle, by the electronic control unit, in response to a driver's accelerator operation;

(c) setting an engine power demand required for the internal combustion engine, by the electronic control unit, based on the driving force demand set in the step (a); and (d) controlling the internal combustion engine and the motor, by the electronic control unit, so that the internal combustion engine outputs a power equivalent to the engine power demand set in the step (c) with exhaust gas recirculation from the exhaust system to the air intake system by means of the exhaust gas recirculation structure and a driving power equivalent to the driving force demand set in the step (b) is ensured when a preset exhaust gas recirculation condition is satisfied and the acquired decrease rate of the engine power demand is not higher than a predetermined rate, the step (d) controlling the internal combustion engine and the motor so that the internal combustion engine outputs a power equivalent to the engine power demand set in the step (c) without the exhaust gas recirculation and the driving power equivalent to the driving force demand set in the step (b) is ensured when the preset exhaust gas recirculation condition is satisfied and the acquired decrease rate of the engine power demand is higher than the predetermined rate.

\* \* \* \* \*